United States Patent [19]

Petcavich et al.

[11] Patent Number: 5,396,052
[45] Date of Patent: Mar. 7, 1995

[54] CERAMIC UTENSIL FOR MICROWAVE COOKING

[75] Inventors: Robert J. Petcavich, San Diego; Gregory A. Kaiser, Fremont, both of Calif.

[73] Assignee: The Rubbright Group, Inc., Minneapolis, Minn.

[21] Appl. No.: 6,390

[22] Filed: Jan. 21, 1993

Related U.S. Application Data

[63] Continuation-in-part of Ser. No. 628,204, Dec. 14, 1990, abandoned.

[51] Int. Cl.⁶ .............................................. H05B 6/80
[52] U.S. Cl. ................... 219/725; 219/728; 219/735; 99/DIG. 14; 426/107; 426/113; 426/234; 426/243
[58] Field of Search ............... 219/725, 728, 729, 730, 219/731, 734, 735; 99/DIG. 14; 426/107, 113, 234, 243; 428/308, 325, 328

[56] References Cited

U.S. PATENT DOCUMENTS

| | | |
|---|---|---|
| 2,830,162 | 4/1958 | Copson et al. ................ 219/10.41 |
| 3,773,669 | 11/1973 | Yamauchi et al. .............. 252/62.5 |
| 3,783,220 | 1/1974 | Tanizaki ....................... 219/10.5 |
| 3,853,612 | 12/1974 | Spanoudis ..................... 117/212 |
| 3,922,452 | 11/1975 | Forker, Jr. et al. ............. 428/35 |
| 3,941,967 | 3/1976 | Sumi et al. ................ 219/10.55 E |
| 3,965,323 | 6/1976 | Forker, Jr. et al. ........... 219/10.55 |
| 3,974,354 | 8/1976 | Long ......................... 219/10.55 |
| 4,027,132 | 5/1977 | Levinson ................. 219/10.55 F |
| 4,190,757 | 2/1980 | Turpin et al. ............... 219/10.55 |
| 4,194,040 | 3/1980 | Breton et al. .................. 428/308 |
| 4,306,133 | 12/1981 | Levinson ................ 219/10.55 E |
| 4,387,077 | 8/1983 | Freedman et al. ........ 219/10.55 E |
| 4,398,077 | 8/1983 | Freedman et al. ........... 219/10.55 |
| 4,478,349 | 10/1984 | Haverland, Jr. et al. ... 219/10.55 E |
| 4,487,349 | 10/1984 | Haverland, Jr. ............... 220/410 |
| 4,542,271 | 9/1985 | Tanonis et al. ........... 219/10.55 E |
| 4,795,649 | 1/1989 | Kearns ........................... 426/243 |
| 4,800,247 | 1/1989 | Schneider et al. ....... 219/10.55 E |
| 4,800,347 | 1/1989 | Schneider et al. ....... 219/10.55 E |
| 4,822,966 | 4/1989 | Matsubara ............... 219/10.55 M |
| 4,973,526 | 11/1990 | Haluska .......................... 428/697 |
| 4,977,302 | 12/1990 | Merigaud et al. ........ 219/10.55 E |
| 5,021,293 | 6/1991 | Huang et al. ................... 428/328 |
| 5,057,659 | 10/1991 | Schneider et al. .............. 219/725 |

Primary Examiner—Bruce A. Reynolds
Assistant Examiner—Tu Hoang
Attorney, Agent, or Firm—Vidas, Arrett & Steinkraus

[57] ABSTRACT

A utensil for use in preparing foods in a microwave oven comprises a microwave transparent, nonconductive, ceramic, opentop food receiving vessel, a microwave transparent, nonconductive, ceramic cover for closing the open top of the vessel, special glaze or coating sintered onto at least the interior surfaces of the vessel and cover or onto both the interior and exterior surfaces thereof; the glaze or coating being comprised of a dielectric matrix and semiconductive particles dispersed throughout the matrix; the percent loading of the conductive particles in the matrix being such that the food contained in the vessel is partially shielded from microwave energy and the glaze absorbs microwave energy and the glaze absorbs microwave energy and converts it to thermal energy concentrated at the utensil so that the outside surface of the food is browned and crisped and the food is cooked from the outside to the inside by the heat transferred to the food from the utensil, as well as being cooked in part from the inside to the outside by microwave energy absorbed within the food.

30 Claims, 1 Drawing Sheet

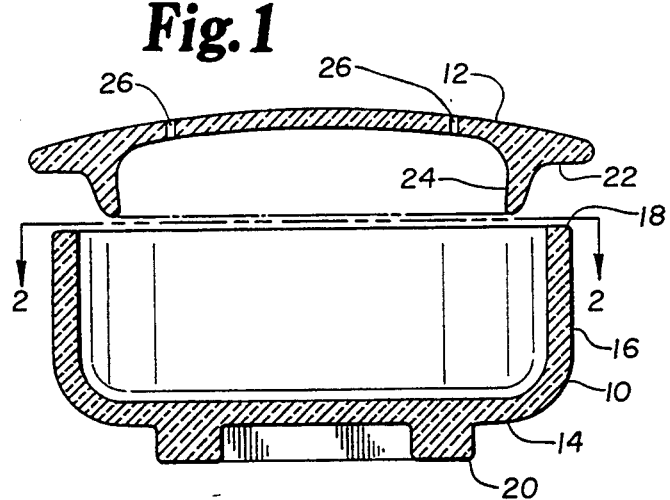
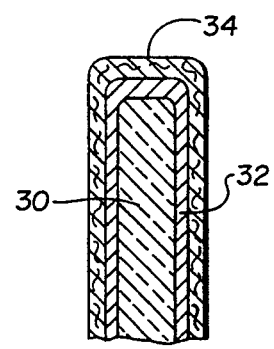
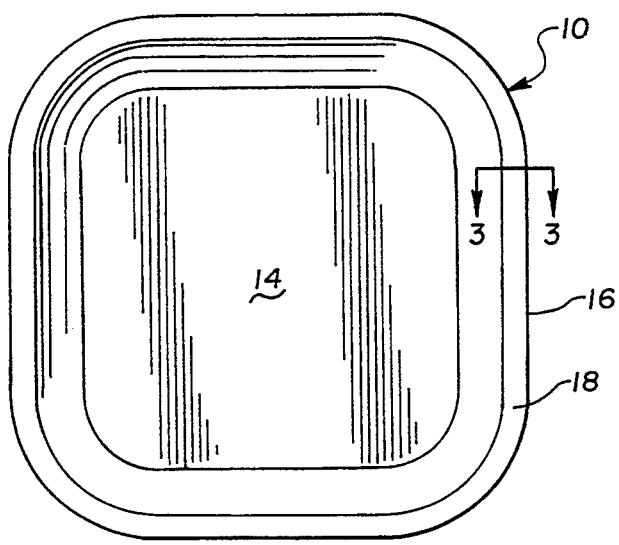
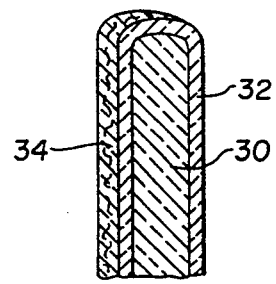
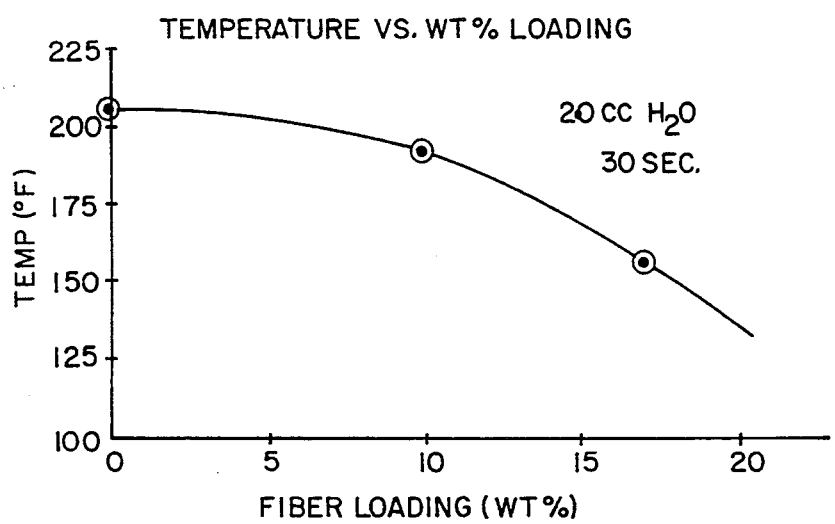

CERAMIC UTENSIL FOR MICROWAVE COOKING

This is a continuation-in-part of application Ser. No. 07/628,204, filed on Dec. 14, 1990, abandoned.

FIELD OF THE INVENTION

The present invention relates to cooking utensils for use in preparing foods in microwave ovens.

BACKGROUND OF THE INVENTION

Ever since consumer acceptance of microwave ovens, considerable effort has been expended in trying to develop microwave cooking techniques that would be effective to produce an edible food product having the appetizing appearance and organoleptic qualities of foods prepared in conventional manners.

Nondisposable, multiple-use, or permanent microwave cookware generally comprises a magnetic composite of one type or another and tends to be heavy, bulky and expensive, while producing merely adequate results at best.

Disposable and semidisposable food packaging comprised of or including components for use in preparing a foodstuff in a microwave oven has met with only limited success for a limited range of food products. Such packaging is usually comprised of paper or plastic and is incapable of withstanding the high temperatures, e.g., in excess of 400 degrees F., required for browning or crisping many foods, particularly meats and dough based products. Also, when it is desirable to shield the foodstuff from excessive internal cooking by absorbed microwave energy, it is necessary to utilize metal foil in the packaging material. The metal foil causes a number of problems, such as runaway heating characteristics and arcing and sparking, and encounters consumer disapproval due to a reluctance to place metal objects in a microwave oven.

In order to be successful, that is, to produce an end product comparable to that produced in a conventional oven, but to do so within the short time frame associated with microwave cooking, microwave cookware should have the ability to shield the foodstuff from excessive internal heating by microwave energy while at the same time providing intense heating, e.g., in excess of 400 degrees F., at the surface of the foodstuff as quickly as possible to brown and crisp the surface and at least partly cook the food from the outside to the inside, as well as from the inside to the outside. Until now, these two criteria for success have proven to be mutually exclusive.

SUMMARY OF THE INVENTION

The object of the invention is to provide improved multiple use microwave cookware which will shield the contained foodstuff from excessive microwave energy and at the same time controllably convert microwave energy into high temperature thermal energy that is transmitted to the outer surfaces of the foodstuff by conduction, convection and/or radiant heat transfer.

Another object of the invention is to provide improved microwave cookware for baking bread products and preparing breaded foodstuffs in a microwave oven in such manner that the end product, though prepared in significantly less time, has the same appetizing appearance and organoleptic qualities as if prepared in a conventional manner in a conventional oven.

A further object of the invention is to provide improved microwave cookware as above described which is not bulky, heavy or unwieldy and that can be produced economically and with substantially any visual aesthetics and/or dish ware geometry as may prove appealing to the consuming public.

In accordance with the invention, improved microwave cookware is comprised of a microwave transparent open top ceramic vessel for receiving the foodstuff to be cooked, a microwave transparent ceramic cover for the vessel, the vessel and cover being essentially nonconductive and having interior surfaces substantially free of sharp corners, and a glaze or coating bonded to the interior surfaces of the vessel and cover or to the interior and exterior surfaces thereof, the coating being comprised of a dielectric matrix and semiconductive particles distributed throughout the matrix, the percent loading of the semiconductive particles in the matrix being such that part of the microwave energy in the oven is reflected away from the interior of the vessel, only a portion of the microwave energy is transmitted to the interior of the vessel, and a portion of the microwave energy is converted by the semiconductive particles in the glaze to high temperature thermal energy conducted to the interior surfaces of the vessel and cover for causing thermal energy to be transmitted from the interior surfaces of the vessel and the cover to the outer surfaces of the foodstuff by convection, conduction and radiant heat transfer, whereby the foodstuff is partially shielded from microwave energy and the amount of heat that is transferred to the outside of the foodstuff by thermal energy from the vessel and the cover is increased relative to the amount of heat that is generated by microwave energy absorbed within the foodstuff.

By appropriate selection of the semiconductive particles and the percent loading of the same in the matrix, the transmission, reflection and absorption characteristics of the glaze can be specifically designed, and the microwave responsive characteristics thereof "finetuned" for optimum preparation of a foodstuff or a group or class of foodstuffs to be cooked or baked in a microwave oven. It is a principal feature of the invention that the external surfaces of the utensil be nonconductive and that the semiconductive glaze be an interior or an interior and exterior coating. In this manner, the ceramic body traps the absorbed heat of the glaze within the cooking vessel and permits the heat to more rapidly and efficiently transfer to the foodstuff's exterior surface. Thus, the invention provides for relatively decreased cooking by microwave energy from the inside to the outside and relatively increased cooking by thermal energy from the outside to the inside of the foodstuff.

Consequently, breads and breaded food products, and other food products which have been found difficult to prepare in a microwave oven, may now be prepared with both the time saving advantages of microwave cookery and the appearance and organoleptic qualities of conventional cookery.

These and other objects and advantages of the invention will become apparent from the following detailed description, as considered in conjunction with the accompanying drawing.

THE DRAWING

FIG. 1 is a vertical section of a representative cooking utensil, comprised of a food receiving vessel and associated cover provided in accordance with the invention;

FIG. 2 is a top plan view of the food receiving vessel taken substantially on line 2—2 of FIG. 1;

FIG. 3 is a vertical cross section, taken substantially on line 3—3 of FIG. 2, illustrating the construction or make-up of the, walls of the food receiving vessel and its cover;

FIG. 4 is a vertical cross section similar to that of FIG. 3 showing an alternate coating structure of the invention; and FIG. 5 is a graphic illustration of the microwave energy shielding characteristics of the utensil of FIGS. 1-3.

DETAILED DESCRIPTION

Referring to the drawings, particularly FIGS. 1, 2 and 3, one embodiment of the cooking utensil of the invention is comprised of an open top food receiving vessel 10 and a mating cover 12 for closing the open top of the vessel.

The vessel 10 is of integral construction and comprised of a bottom wall 14 and upwardly extending sidewalls 16 which terminate in a continuous, horizontal, upwardly facing top edge or lip 18. The vessel 10 may be of any size, shape or configuration customary for cookware and/or of such geometry as may be deemed desirable for purposes of consumer acceptance. Also, various decors may be imparted to the exterior surfaces of the vessel to enhance consumer acceptance. The interior surface of the bottom wall 14 may, if desired, be ribbed for purposes of draining moisture from foodstuffs being cooked, and the exterior of bottom surface of the wall 14 may be provided with a spacer rib 20 to facilitate fabrication and finishing of the vessel 10. The cover 12 is coextensive with and of the same geometric shape as the vessel 10 and is provided at the edges of its lower surface with a continuous, horizontal, downwardly facing marginal lip 22 for seating engagement with and upon the lip 18 of the vessel 10. Preferably, and as is conventional, the cover includes a downwardly extending guide rib 24 inwardly of the marginal lip 22 of the same shape and approximately the same size as the open top of the vessel 10 for guided reception within the open top of the vessel for retaining the cover on the vessel.

The cover and/or the vessel may, if desired, be provided with handles or hand grips (not shown) as are conventional in the cookware art.

Also, one or more vent holes may be provided in the cover 12 and/or in the upper regions of the side walls 16 of the vessel 10 for venting water vapor from the interior of the vessel when cooking high moisture content foods. In the preferred embodiment, small vent holes 26 are provided in the cover 12. In order to prevent undesired transmission of microwave energy through the vent holes into the interior of the utensil, the diameter of the holes must be no larger than $\frac{1}{2}$ the wavelength of the microwave energy generated by klystron of the microwave oven and, for aesthetic purposes, should preferably be no larger than about 1/20 of such wavelength, i.e., $\lambda/20$.

The exterior of the vessel and cover may take such configuration as desired for aesthetic purposes, but the interior surfaces of both the vessel 10 and the cover 12 must be substantially free of sharp or angular corners, i.e., with all wall junctures, intersections and corners formed with generous corner radii.

The vessel 10 and cover 12 are formed, preferably molded, of a nonconductive, dielectric ceramic material, such as earthenware, pottery, glass or porcelain, fired at high temperature as is well known and long practiced in the art. If the base material of construction, indicated at 30 in FIG. 3, is earthenware or pottery, the base material should be sealed by a glaze 32 fired onto the base material at high temperature. Such glaze is not required on a glass substrate, but may if desired be fired onto the exterior surfaces of glass substrates for aesthetic purposes. Typical firing temperatures for ceramic and crystal glazes are in the order of 1,000 degrees C., plus or minus 250 degrees C.

In the embodiment of the invention shown in FIGS. 1, 2 and 3, the base material 30 may be any of a number of relatively inexpensive, microwave transparent, nonconductive ceramic compositions known to be thermal shock and heat resistant as well as being compatible with food products and capable of remaining structurally stable at glaze firing or sintering temperatures. The glaze 32 may be any of a number of microwave transparent, nonconductive ceramic glazes conventionally used and universally accepted for use in connection with household cookware. Glaze 32 covers the entirety of the exterior surfaces of the vessel and cover, and may optionally cover the interior surfaces as well. Glazes of different colors and/or incorporating various designs and/or motifs may be fired onto the exterior surfaces a large variety of suitable ceramic and crystal glazes are available from Mayco Colors, Chatsworth, Calif. 91311.

In accordance with the invention, both the base material 30 and the ceramic glaze 32 must be essentially, preferably completely, nonconductive and microwave transparent, e.g., with an R.F. energy attenuation of less than about 3 decibels.

In the embodiment of FIGS. 1, 2 and 3, the interior surfaces of the vessel 10 and cover 12 are additionally coated with a semiconductive glaze 34 (FIG. 3) comprised of a dielectric matrix and semiconductive particles distributed, preferably substantially uniformly distributed, throughout the matrix. The glaze 34 is preferably formulated as a liquid or fluent slurry that is sprayed to a metered or controlled thickness onto the entirety of the interior surfaces of the vessel and the cover, including the lips 18 and 22 and the guide rim 24. The thus sprayed vessel and cover are then fired in an oven to sinter and bond the composite coating or glaze 34 onto the vessel and the cover.

Alternatively, the semiconductive glaze 34 may also be included on the exteriors of the vessel 10 and cover 12, as shown in the embodiment of FIG. 4, in addition to the interior semiconductive glaze coating 34. This version simplifies manufacturing and creates higher temperatures within the walls of the vessel and cover for conductive heating.

At present, the preferred matrix material is a fluoropolymer, such as the products sold by E.I. DuPont DeNemours & Co. under the trademarks "TEFLON" and "SILVERSTONE" for use as nonstick cooking surfaces in conventional cookware. Such fluoropolymers have a sintering or firing temperature of only about 500 to 800 degrees F. and a cure time of only about 10 minutes, as contrasted to firing temperatures of 1,000 degrees C. and cure times of up to 24 hours for ceramic glazes. The semiconductive particles distributed throughout the matrix in the coating or layer 34 may take a variety of forms, subject to the basic criteria that they be food compatible, readily and substantially homogeneously dispersible throughout the matrix, and sufficiently resistant to the sintering temperature of the matrix material that their semiconductivity is not significantly degraded or impaired. Semiconductive materials appropriate to the purpose, include flakes, powders, needles and/or fibers of suitable semiconductive materials, such as carbon black, graphite, tungsten oxide, silicon carbide, other semiconductors such as silicon and germanium, and particularly other metal oxides and various substrate materials bearing a suitable semiconductive coating. Presently preferred particulate materials comprise carbon black coated glass fibers or glass fibers coated with a semiconductive metal oxide, such as tin oxide, indium oxide, and indium tin oxide. In some instances carbon black particulate without glass fibers may be preferred. Other semiconductive ceramic and semiconductive metal coatings on fibers are known. The design requirements of these coatings is that they be conductive between about minus 10 degrees C. up to at least 300 degrees C., and reasonably oxidation resistant up to the sintering temperature of the glaze. Metal oxide or carbon black coated glass fibers are presently preferred because of their oxidative stability at high temperature, ease of dispersion in the fluoropolymer matrix material, low cost and food contact compatibility. Suitable conductive fiber products are available from Ensci, Inc., Woodland Hills, Calif., 91367.

By use of the term "semiconductor", it is intended to describe and designate for use in this invention those semiconductive materials generally accepted as being elements or compounds having an electrical conductivity intermediate between that of conductors and nonconductors (insulators). Most metals have quite high conductivity, while substances like diamond and mica have very low conductivity (high resistance). Between these extremes lie the semiconductors, of which germanium, silicon, silicon carbide and selenium are examples, with resistivities in the range of $10^{-2}$ to $10^9$ ohms/cm. Slight traces of impurity in the crystalline structure may be required in some instances for semiconduction.

Formulation of layer 34 from a fluoropolymer matrix and semiconductively coated glass fibers is a convenient mode for carrying out the invention for the reasons that the sintering temperature and cure time of the fluoropolymer is not so high as to cause degradation of the fibers, or to significantly diminish or impair the semiconductivity of the coated fibers, or to require a disproportionately large percent loading of the fibers in the matrix. In contrast, at the very high sintering temperatures of ceramic and crystal glazes, semiconductive particulates presently available to us, and used in reasonable degrees of concentration in the matrix, do not in our experience fulfill our expectations and requirements for the conductive glaze 34. Carbon black in a suitable matrix may meet this requirement. Thus, if acceptable, such a ceramic glaze/conductive particulate combination can be used without double glazing of the interior surfaces of nonglass ceramics, as indicated at 32-34 in FIG. 3. A single layer of conductive glaze could be used on the interior surfaces of the vessel and the cover, and a single layer of nonconductive glaze could be used on the exterior surfaces.

As used herein with reference to the conductive interior layer 34 of the invention, the term "glaze" is intended to encompass not only ceramic glazes but also the sintered, semiconductive-particulate loaded fluoropolymer comprising the best mode presently known for carrying out the invention. Like ceramic glazes, the semiconductive fluoropolymer glaze may be applied directly to the surfaces of the vessel 10 and the cover 12 (without the underlying ceramic glaze 32 illustrated in Fib. 3), in order to enhance the bonding and adherence of the glaze to the ceramic.

The purpose of the semiconductive glaze whether on the interior surfaces of the vessel 10 and the cover 12 only, or on interior and exterior, is to control transmission, reflection and absorption by the utensil of the microwave energy generated by the klystron in a microwave oven. The degree or percentage loading and dispersion of the conductive particulates in the matrix of the glaze 34 will affect each of these criteria, so that by proper selection of percent loading and dispersion of the utensil can be specifically designed and its microwave responsive characteristics "fine tuned" for optimum preparation of a selected food product or a selected class or group of food products.

Generally stated, the object is to controllably reduce transmission of microwave energy into the interior of the utensil in order to decrease the amount of heat (degree of cooking) that is generated by the microwave energy absorbed within the contained foodstuff and to controllably convert microwave energy in the oven into a controlled level of thermal energy concentrated on the interior surfaces of the utensil to increase the amount of heat (degree of cooking ) that is transmitted to the outer surfaces of the contained foodstuff by conduction, convection and/or radiant heat transfer, thereby to provide an optimum balance between the degrees of cooking that take place from the outside to the inside and from the inside to the outside of the foodstuff contained in the utensil, and the degree of browning or crisping that takes place on the exterior surface of the foodstuff.

The percent loading of the semiconductive particles in the dielectric matrix may vary quite widely depending upon the conductivity of the particles, the physical shape of the particles, the degree of shielding desired for the food product, and the amount of thermal energy to be generated on the interior surfaces of the utensil. A suitable loading range is generally in the order of from about 1% to about 40% by weight; the percent loading of the most conductive particulates being at the lower end of the range and the percent loading of the least conductive particulates being at the upper end of the range.

In one of the embodiments, for reasons next to be explained, the percent loading of the semiconductive glass fibers in the fluoropolymer matrix is preferably in the order of about 10% to about 25%.

Effects of varying the percent loading of the semiconductive particulates in the dielectric matrix of the glaze 34 are graphically illustrated in FIG. 5 for an interior coated version of the invention. The numerical values indicated on the graph are for a glaze comprised of a fluoropolymer matrix and conductively coated glass fibers. The graph was obtained by placing 20 cc of water at about 75 degrees F. in a microwave transparent container, placing the container within respective ones of utensils having glazes containing different loadings of conductive fibers, placing each of the utensils in a microwave oven set on high for 30 seconds, and measuring the temperature of the water after heating. These test criteria were selected for purposes of comparison with the amount of time required to bring 20 cc of water at room temperature to a boil in a microwave oven, namely 30 seconds. The ending temperature of the water is indicated on the ordinate and the percent by weight loading of the conductive fibers in the matrix is indicated on the abscissa of the graph. At 0 percent loading, the ending temperature was 210 degrees F., indicating that the water had been heated nearly to boiling by directly absorbed microwave energy and that the *Teflon* coated ceramic utensil itself was microwave transparent and had essentially no impact on the results. At 10 percent loading, the ending temperature was about 195 degrees F., indicating a significant decrease in the transmission of the microwave energy into the water, i.e., that the loaded glaze 34 had shielded the water from a significant proportion of the microwave energy in the oven. At 17 percent semiconductive fiber loading, the ending temperature of the water was about 160 degrees F., indicating a reduction of approximately 40 percent in the amount of heat generated by absorption of microwave energy in the water, i.e., cooking from the inside out. There was, therefore, about a 40 percent shielding of the water (contained foodstuff) from the microwave energy in the oven. Also, in the latter test, though not measured scientifically, there was a sensible increase in the heat absorbed by the ceramic utensil, especially on the interior surfaces of the same. The semiconductive fiber loaded glaze 34 converted some of the microwave energy into thermal energy at the interior surface of the vessel and its cover. The ceramic material, while acting as an insulator for the semiconductive glaze, also absorbed heat from the glaze so that the ceramic utensil in effect becomes a "brick oven within an oven", thereby producing the desired results of intense heating from the exterior of the food accompanied by controllably reduced heating from within the interior of the food.

Based on the foregoing observations and experiences, design criteria for one version of an economical consumer product that is effective for baking breads, bread-type products and breaded foodstuffs would reside in use of a relatively inexpensive ceramic vessel 10 and cover 12 of conventional construction having interior surfaces substantially free of sharp or angular corners and bearing a ceramic glaze 32 on at least their exterior surfaces; a semiconductive glaze coating 34 sprayed onto the interior surfaces of the vessel and the cover by metered spraying to a thickness no greater than about 2 mils. to avoid flaking and/or peeling of the glaze after sintering; the glaze comprising a fluoropolymer matrix loaded with glass fibers coated with a conductive metal oxide; the glaze 34 being sintered and bonded onto the interior surfaces of the vessel and the cover at a sintering temperature not exceeding about 1000 degrees F.; the percent by weight loading of the semiconductive fibers in the glaze being in the order from about 10 to about 25 percent (per the FIG. 5 graph) and having a microwave absorption of up to about 25 percent, with approximately equal amounts of microwave transmission and reflection; the microwave absorption characteristic being mated to the thickness of the glaze to produce a temperature on the interior surfaces of the utensil in the order of from about 350 degrees F. to about 500 degrees F. In one embodiment, microwave absorption is about 40-60 percent, and a microwave reflectance about 40-50 percent.

The resultant product in all embodiments is a mass producible, multiple use microwave cooking utensil having the advantageous characteristics of being inexpensive, reusable, contact compatible with foods, nonmetallic, nonflammable, dishwasher compatible, capable of withstanding high temperatures in a microwave environment, and producible in a variety of consumer appealing shapes, designs, and colors. Most importantly, foods prepared in the utensil in a microwave oven have the same appetizing appearance and desirable organoleptic qualities of aroma, feel and taste as if prepared in a conventional manner in a conventional oven.

In accordance with the invention, the semiconductive coating on the glass fiber embodiment can be thick and robust and the electrical properties of the glaze 34 can be independently controlled via the amount of fibers in the glaze and their dispersion. Another benefit of the invention in this embodiment is that the semiconductive fibers themselves are surrounded by the matrix of the glaze and thus protected from damage and/or degradation. Consequently, the utensil has good stability in its heating characteristics.

In an experimental test of the invention, using a ceramic vessel and cover (like those illustrated in FIGS. 1, 2 and 3) without vent holes 26 and without a conventional glaze, but with their interior surfaces coated with the glaze of the invention, chicken legs coated with General Food Corporation's "*Shake 'N Bake*" (TM) brand of "*Oven Fry*" (TM) coating for chicken, extra crisp recipe, were prepared to organoleptic perfection in a Sharp Carousel II (TM) microwave oven set on high by cooking the chicken legs for 2½ minutes, removing the cover to vent the utensil (since it has no vent holes), and continuing the cooking for another 2½ minutes. In contrast, the directions on the container of coating mix require cooking of the coated chicken for 50 minutes in a conventional oven preheated to 400 degrees F.

The objects and advantages of the invention have therefore been shown to be achieved in a practical, facile and economical manner.

While preferred embodiments of the invention have been herein illustrated and described, it is to be appreciated that various modifications, changes and rearrangements may be made therein without departing from the scope of the invention, as defined by the appended claims.

What is claimed is:

1. A cooking utensil for preparing food in a microwave oven comprising:

an open top ceramic vessel for receiving foodstuff to be cooked in a microwave oven;

a ceramic cover for closing the open top of said vessel;

said vessel and said cover being microwave transparent, having exterior surfaces which are essentially nonconductive, and having interior surfaces which are substantially free of sharp corners, said interior surfaces defining an interior portion of the cooking utensil;

a glaze bonded onto at least the interior surfaces of said vessel and said cover said glaze comprising a dielectric matrix and semiconductive particles distributed throughout said matrix;

said glaze in part shielding the interior of the utensil from microwave energy and in part absorbing microwave energy in the oven and converting the absorbed microwave energy into high temperature thermal energy for causing thermal energy to be transferred from the interior surfaces of said vessel and said cover to an outer surface of the foodstuff by convection, conduction and radiant heat transfer, and the percent loading of said semiconductive particles in said matrix being selected to partially shield the foodstuff in said vessel from the microwave energy in the oven and to increase the amount of heat that is transferred from the interior surfaces of said vessel and said cover to the outer surface of the foodstuff relative to the amount of heat that is generated by the microwave energy absorbed within the foodstuff.

2. A cooking utensil as set forth in claim 1 wherein said vessel and said cover are glass.

3. A cooking utensil as set forth in claim 1 wherein said vessel and said cover are earthenware.

4. A cooking utensil as set forth in claim 1 wherein each of said vessel and said cover are selected from materials consisting of glass earthenware and at least partially glazed pottery and glass.

5. A cooking utensil as set forth in claim 1 wherein the percent by weight loading of said semiconductive particles in said dielectric matrix is in the order of about 1% to about 40% depending upon the conductivity of the particles.

6. A cooking utensil as set forth in claim 1 wherein said glaze is sintered onto the interior surfaces of said vessel and said cover, and comprises a dielectric matrix having a curing temperature less than the degradation temperature of said semiconductive particles and less than the temperature at which the conductivity of the semiconductive particles is significantly impaired.

7. A cooking utensil as set forth in claim 1 wherein said dielectric matrix comprises a fluoropolymer and said semiconductive particles comprise semiconductive flakes, fibers, needles or powder distributed throughout said fluoropolymer.

8. The utensil of claim 7 wherein the semiconductive particles are carbon black.

9. A cooking utensil as set forth in claim 1 wherein said dielectric matrix comprises a fluoropolymer and said semiconductive particles comprise glass fibers bearing a semiconductive coating.

10. The utensil of claim 9 wherein the coating is carbon black.

11. The utensil of claim 9 wherein the coating is a metal oxide.

12. A cooking utensil as set forth in claim 9 wherein the percent loading of the semiconductive particles in the fluoropolymer matrix is on the order of from about 10 to about 25 percent by weight.

13. A cooking utensil as set forth in claim 1 wherein at least one vent hole is provided in a least one of said cover and said vessel for venting water vapor from the interior of the utensil said hole being no greater than about ½ the wavelength of the microwave energy generated by a microwave oven.

14. A cooking utensil as set forth in claim 13 wherein the diameter of each said vent hole is not greater than about 1/20th the wavelength of the microwave energy generated by the oven.

15. A cooking utensil as set forth in claim 1 wherein the semiconductive particles in said glaze have a percent loading at which said glaze absorbs up to about 25 percent of the microwave energy in the oven, and reflects and transmits approximately equal percentages of the microwave energy in the oven, whereby the sum of the percentage of microwave energy reflected by said glaze and the percentage of microwave energy transmitted by said glaze is about 75% of the microwave energy in the oven.

16. A cooking utensil as set forth in claim 1 wherein said glaze comprises a fluoropolymer matrix no greater than about 2 mils. thick and the semiconductive particles in the matrix have a percent loading at which said glaze will transmit on the order of about 45 percent, reflect on the order of about 50 percent and absorb on the order of about 5 percent of the microwave energy in the oven.

17. A cooking utensil as set forth in claim 1 wherein the food stuff comprises a bread product or a foodstuff having a breaded surface and the percent loading of semiconductive particles in said glaze is sufficient to shield the foodstuff from about 40 to about 60 percent of the microwave energy in the oven and allows sufficient energy to be absorbed by the glaze to produce a thermal temperature of from about 350° F. to about 500° F. on the interior surfaces of said vessel and said cover.

18. A cooking utensil as set forth in claim 1 wherein the glaze is substantially only on the interior of the utensil vessel and cover.

19. A cooking utensil as set forth in claim 1 wherein the glaze extends substantially to the exterior of the vessel and cover.

20. A cooking utensil for preparing food in a microwave oven comprising:

an open top ceramic vessel for receiving foodstuff to be cooked, said vessel having bottom and sidewalls and an upwardly facing lip at the upper edge of said sidewalls;

a ceramic cover for closing the open top of said vessel, said cover having a lower surface which further comprises a downwardly facing lip for mated engagement with the upwardly facing lip on said vessel;

said vessel and said cover being microwave transparent and essentially nonconductive and having interior surfaces substantially free of sharp corners, said interior surfaces defining an interior portion of the cooking utensil, and a glaze bonded on at least the interior surfaces of said vessel and said cover including the mating lips thereon;

said glaze comprising a dielectric matrix and semiconductive particles distributed throughout said matrix;

the percent loading of the semiconductive particles in the matrix being sufficient to cause a portion of the microwave energy in the oven to be reflected away from the interior portion of the utensil, a portion of the microwave energy to be transmitted to the interior portion of the utensil and a portion of the microwave energy to be converted to high temperature thermal energy by the semiconductive particles in the glaze for causing thermal energy to be transferred from the interior surfaces of said vessel and said cover to an outer surface of the foodstuff by convection, conduction and radiant heat transfer; and said glaze particularly shielding the foodstuff from absorption of microwave energy and causing the amount of heat transferred to the outer surface of the foodstuff as thermal energy from the interior surfaces of said vessel and said cover to be increased relative to the amount of heat that is generated by the microwave energy absorbed within the foodstuff.

21. A cooking utensil as set forth in claim 20 including a downwardly extending guide rib on the lower surface of said cover inwardly of said downwardly facing lip for guided entry into the open top of said vessel, said glaze also being bonded to said rib.

22. A cooking utensil as set forth in claim 20, including said glaze on the exterior of the utensil and cover.

23. A cooking utensil as set forth in claim 20 wherein the semiconductive particles comprise carbon black.

24. A cooking utensil as set forth in claim 20 wherein the semiconductive particles comprise metal oxide coated fiber glass fibers.

25. A method of preparing foods in a microwave oven comprising the steps of:

placing the food in a microwave transparent, nonconductive ceramic utensil comprised of an open top food receiving vessel and a cover for the open top of the vessel said vessel and cover further having interior surfaces and exterior surfaces;

exposing the ceramic utensil to microwave energy in a microwave oven;

partially shielding the food in the utensil from the microwave energy in the oven;

converting a portion of the microwave energy present in the oven to thermal energy concentrated on the interior surfaces of the vessel and the cover;

the shielding and converting steps being performed by applying a semiconductive glaze to at least the interior surfaces of the vessel and the cover prior to placing the food in the utensil and exposing the utensil to microwave energy;

the semiconductive glaze being comprised of a dielectric matrix and semiconductive particles distributed throughout the matrix in sufficient proportion to perform the shielding and converting steps when the food containing utensil is exposed to microwave energy; and cooking the food in the utensil partially by absorption of microwave energy within the food and primarily by transfer of thermal energy from the interior surfaces of the vessel and the cover to the exterior surfaces of the food.

26. A method of making cooking utensils for use in preparing foods in microwave ovens comprising the steps of:

forming from a microwave transparent, nonconductive ceramic material an open top food receiving vessel and a mating cover for the open top of the vessel, said vessel and cover having interior and exterior surfaces;

applying to at least the interior surfaces of the vessel and the cover a glaze comprised of a dielectric matrix and semiconductive particles distributed throughout the matrix, the percent loading of the semiconductive particles in the matrix being sufficient to partially shield the interior of the utensil from microwave energy and to partially absorb microwave energy for conversion to thermal energy at the interior surfaces of the utensil; and sintering the glaze to bond said glaze to the interior surfaces of the vessel and the cover.

27. In a method as set forth in claim 26, said glaze comprising a dielectric matrix having a sintering temperature less than the degradation temperature of the conductive particles therein and less than the temperature at which the conductivity of said semiconductive particles is significantly impaired.

28. In a method as set forth in claim 27, said dielectric matrix comprising a fluoropolymer and said semiconductive particles comprising glass fibers bearing a semiconductive coating.

29. In a method as set forth in claim 28 wherein the semiconductive coating is a metal oxide.

30. In a method as set forth in claim 27 wherein the semiconductive particles are carbon black.

* * * * *